Oct. 9, 1923.

T. F. KUHN 1,470,085

CORN CUTTING AND SHOCKING MACHINE

Filed June 25, 1920   5 Sheets-Sheet 2

Witness
Martin H. Olsen.

Inventor
Thomas F. Kuhn
By Louis C. Vanderlip
Atty.

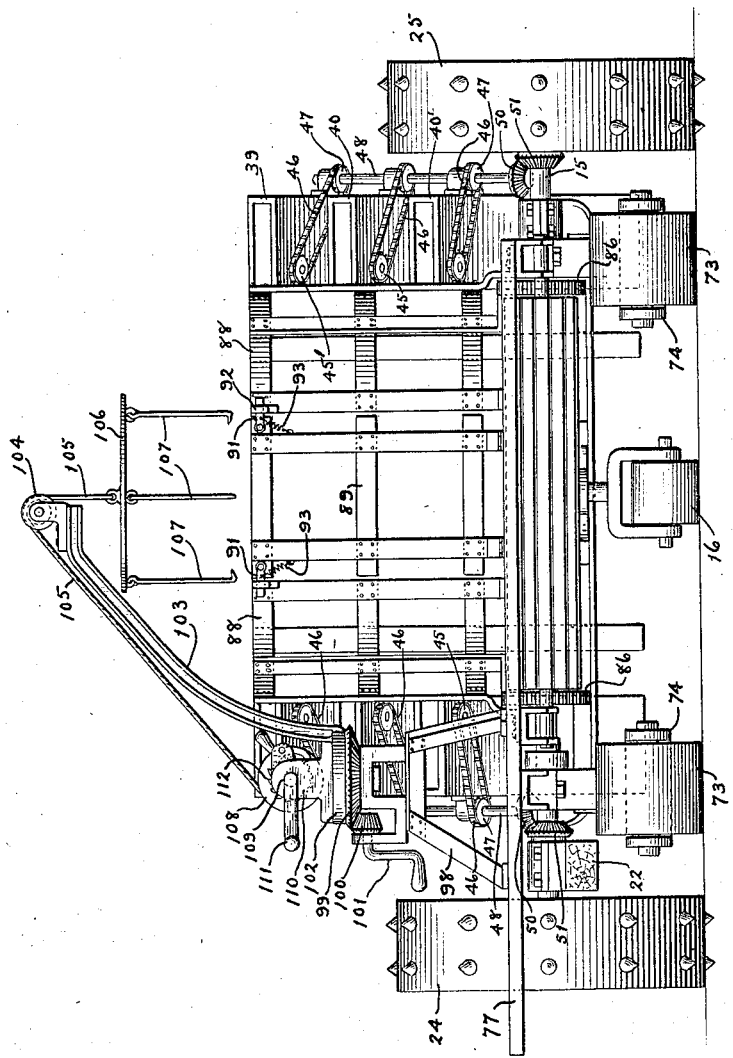

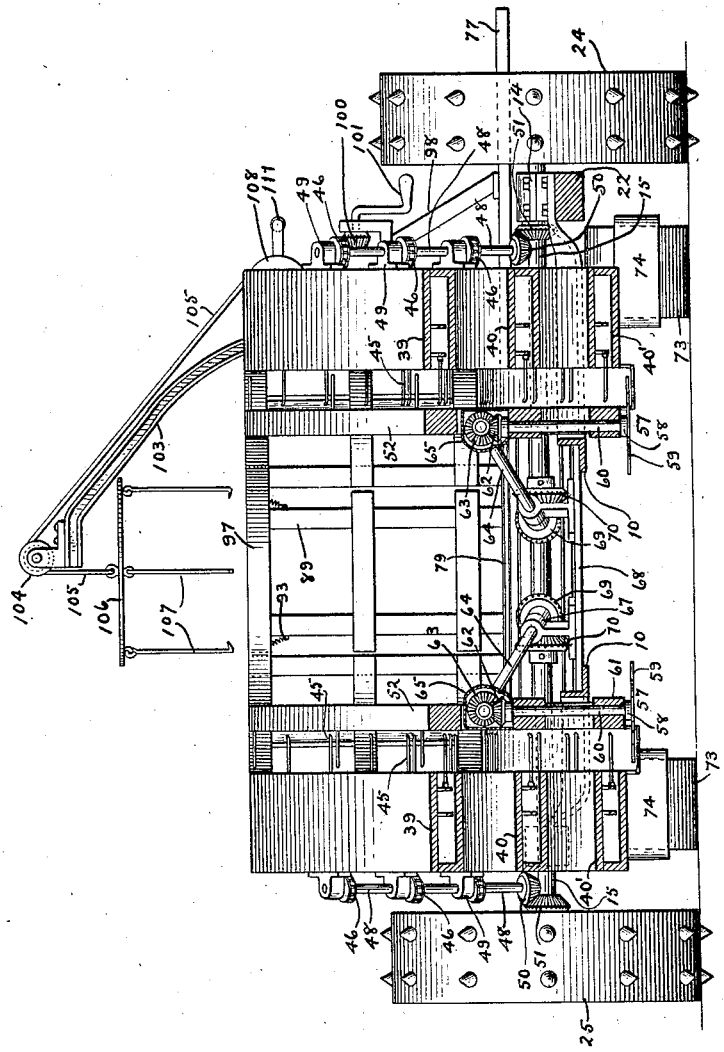

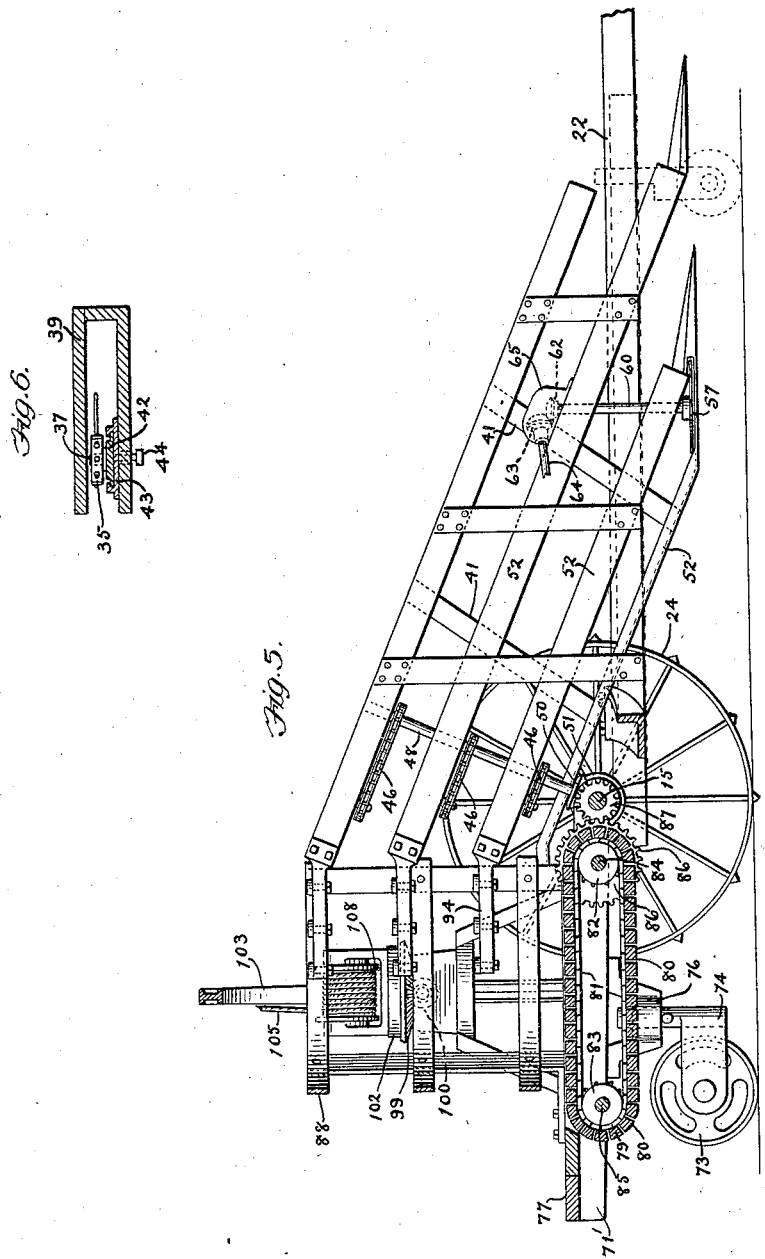

Patented Oct. 9, 1923.

1,470,085

UNITED STATES PATENT OFFICE.

THOMAS F. KUHN, OF ELKHART, INDIANA.

CORN CUTTING AND SHOCKING MACHINE.

Application filed June 25, 1920. Serial No. 391,650.

*To all whom it may concern:*

Be it known that I, THOMAS F. KUHN, a citizen of the United States, and a resident of the city of Elkhart, county of Elkhart, Indiana, have invented certain new and useful Improvements in Corn Cutting and Shocking Machines, of which the following is a specification.

My invention relates to corn cutting and shocking machines.

An important object of the invention is to provide a machine of the above mentioned character, which is adapted to be driven down or along a row or rows of corn, and will cut the stalks at a suitable distance from the ground, and assemble them in a more or less parallel relation, into a shock or bundle, to be deposited upon the ground.

A further object of the invention is to provide a machine of the above mentioned character, having means to cut a plurality of rows of corn, such as two, and assemble the same into the shock.

A further object of the invention is to provide means whereby the different portions of the machine may partake of relative movements, when passing over irregular ground, thus accommodating itself to the same.

A further object of the invention is to provide convenient and reliable means for conveying the shock from the shocking means to its point of deposit.

A further object of the invention is to provide means whereby the traction wheels of the machine may partake of a differential action.

Other objects and advantages of the invention will be apparent during the course of the following description.

Figure 1:
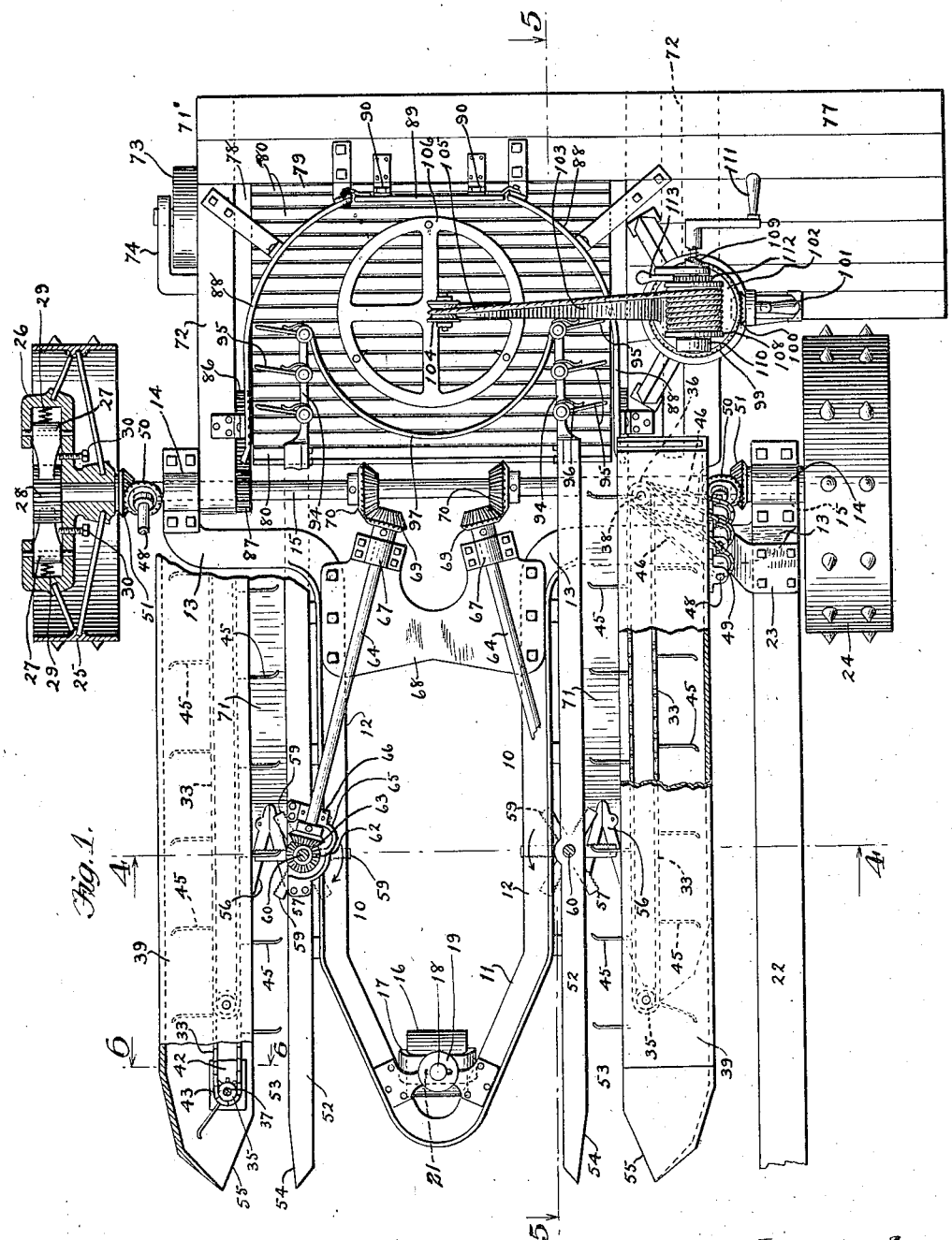
Figure 2:
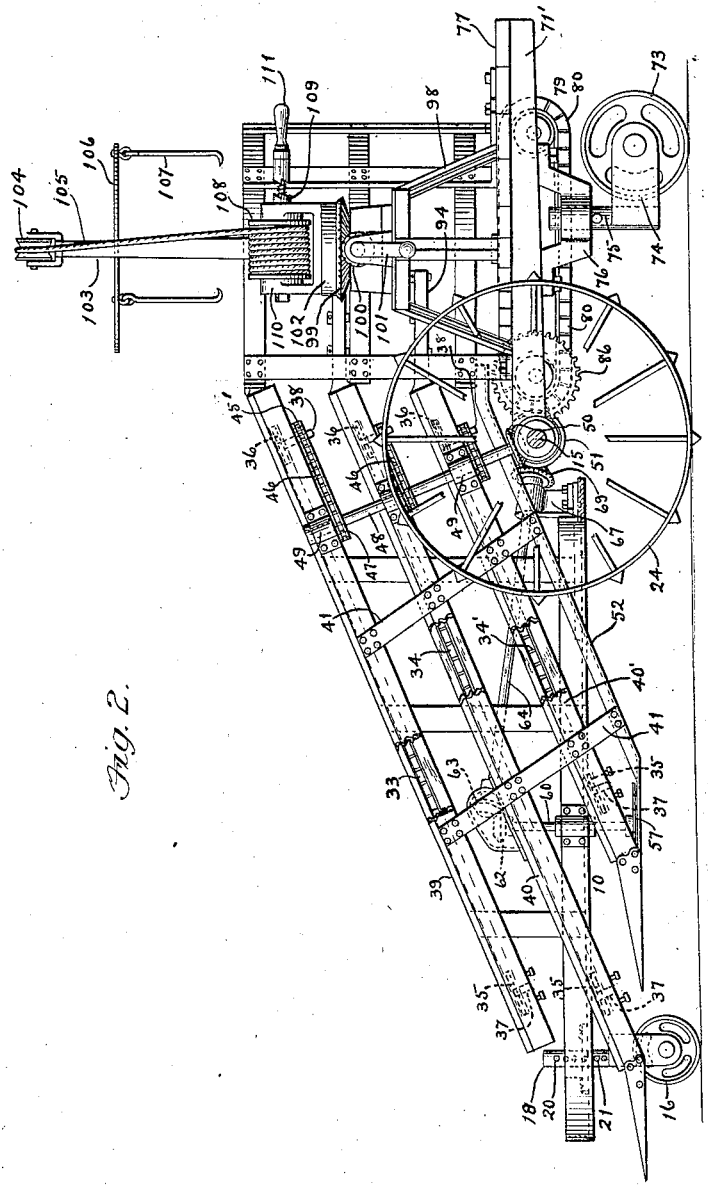

In the accompanying drawings forming a part of this specification, and in which like numerals are employed to designate like parts throughout the same, Figure 1 is a plan view of a machine embodying my invention, parts being broken away, and parts in section, for the purpose of illustration, Figure 2 is a side elevation of the same.

Figure 3 is a rear end elevation of the machine,

Figure 4 is a transverse section taken on line 4—4 of Figure 1, looking in the direction of the arrow, Figure 5 is a longitudinal section taken on line 5—5 of Figure 1, looking in the direction of the arrow, Figure 6 is a transverse section taken on line 6—6 of Figure 1.

In the drawings, wherein for the purpose of illustration is shown a preferred embodiment of my invention, the numeral 10 designates the main frame of the machine, having a forward U-shaped portion 11, and longitudinal arms 12, disposed in parallel relation. At their rear ends, these arms are bent outwardly, forming transverse extensions 13, carrying at their ends journal boxes or bearings 14, pivotally receiving a transverse axle 15, as shown. The main frame 10 is substantially horizontally arranged, and is adapted to partake of slight vertical swinging movements, with respect to the axle, and its forward end is supported by a ground engaging wheel 16, pivoted within a castor 17, having a vertical shank 18. This vertical shank is pivoted within a vertical bearing 19, rigidly secured to the U-shaped portion 11. The shank 18 has a plurality of vertically spaced apertures 20, for receiving a pin 21, arranged beneath the bearing 19. It is thus seen that the wheel 16 is vertically adjustable with relation to the main frame 10, and is adapted to support the same at different distances from the ground.

The machine is drawn forwardly over the ground by horses, a tractor, or the like, suitably connected with a draft appliance, comprising a longitudinal tongue 22, forming in effect a continuation of the extension 13 to the left, Figure 1, the extension 13 being provided with a lateral arm 23 which is rigidly secured to the tongue 22.

The ends of the axle 15 are supported by traction wheels 24 and 25. The traction wheel 24 may be rigidly secured to this axle, while the wheel 25 is rotatable thereon. As more clearly shown in Figure 1, the wheel 25 embodies a hub portion 26, within which are pivoted palls 27, adapted to engage a ratchet wheel 28. This ratchet wheel is rigidly secured to the end of the axle 15. The palls 27 are urged inwardly to engage this ratchet wheel by springs 29, and adjustable bolts 30 may be employed to hold the palls out of engagement with the ratchet wheel, when it is desired to render the wheel 25 idle upon its axle. It is thus apparent that the traction wheels 24 and 25 may partake of a differential action, when the machine is being turned. If desired, both traction wheels 24 and 25 may be equipped with the pall and ratchet mechanism.

Means are provided to engage and convey the corn stalks, in a more or less upright position, in proximity to cutting means. The conveying means preferably comprises upper, intermediate and lower inclined endless sprocket chains 33, 34 and 34'.

These sprocket chains engage sprocket wheels 35 and 36 carried by shafts 37 and 38. The sprocket chains operate within upper, intermediate and lower inclined supports or housings 39, 40 and 40', and the shafts 37 and 38 are pivotally connected therewith. The housings 39, 40 and 40' are connected with bars or braces 41, retaining them parallel, and these bars or braces are suitably rigidly connected with the main frame 10, as shown. The shafts 37 are preferably adjustable, to take up any slack in the sprocket chains, and for this reason they are pivoted upon slidable plates 42, arranged in grooved plates 43, bolted or rigidly secured within the housing. A clamping bolt 44 is employed to lock the sliding plate 42 in adjustment to the base plate 43. The sprocket chains 33, 34 and 34' carry fingers 45, preferably rigidly secured thereto, and adapted to extend outwardly beyond the housing, upon the inner side thereof, and traveling rearwardly, as clearly shown in Figure 1.

The shafts 38, as clearly shown in Figure 2, project downwardly below the housings 39, 40 and 40' and carry sprocket wheels 45', engaged by sprocket chains 46, extending forwardly to engage sprocket wheels 47, rigidly secured upon a vertical shaft 48. The shaft 48 is journaled in bearings 49, carried by the housings. At its lower end a bevel gear 50 is rigidly secured to the shaft 48, and is driven by a bevel gear 51 rigidly secured to the axle 15. It is thus seen that the sprocket chains or the conveying means are actuated from the axle.

Arranged inwardly of and near and spaced from the sets of housings are guide beams 52 forming with the housings guide passages 54. These guide beams may be horizontally arranged and their forward ends 54 diverge with relation to the diverging ends 55 of the housings. These guide beams are rigidly secured to the frame 10 by any suitable means.

The numeral 56 designates V shaped cutters, which are preferably stationary, and diverge forwardly. These cutters are arranged within the guide passages 53 and are rigidly secured to the beams 52 and the lower housings 40'. These V shaped relatively stationary cutters are horizontally disposed and arranged a suitable distance from the ground which distance may be varied by vertically adjusting the frame 10. Arranged near and above the stationary V shaped cutters are horizontally rotating cutters 57, embodying a hub 58 and carrying blades 59, which are radial and have their cutting edges serrated.

These cutters turn in the direction of the arrows. Each cutter is rigidly mounted upon a vertical shaft 60, journaled in a bearing 61, preferably secured to the beam 52. The shafts 60 have bevel gears 62, rigidly secured to their upper ends, which are engaged by bevel gears 63, carried by shafts 64. These gears are enclosed by a housing 65, secured to the frame 10 and beam 52, the shaft 64 being journaled at 66 adjacent said housing. The shafts converge rearwardly and are journaled within bearings 67, rigidly secured to a bracket 68 which may be bolted to the frame 10. At their rear ends the shafts 64 carry bevel gears 69, rigidly secured thereto, and driven by a bevel gear 70, rigidly mounted upon the axle 15, as shown. Disposed at the rear of the V shaped cutters 56 are relatively stationary conveyor plates 71, upon which the cut stalks of corn are carried, in approximately vertical position, by the fingers 45. The V shaped stationary cutter, and the rotatable cutter, coact to cut the stalks.

At the rear of the machine is an auxiliary frame 71', including beams 72, the forward ends whereof may be pivotally connected with the axle 15. This auxiliary frame may be supported by wheels 73 pivoted within castors 74 carrying shanks 75. These shanks are pivoted within brackets 76, secured to the frame 71'.

It is obvious that the auxiliary frame may partake of restricted vertical swinging movements with respect to the main frame, whereby the machine will adjust itself when traveling over irregular ground. The frame 71' embodies a platform 77, for the operator.

The frame 71' is provided with a main opening 78, within which is disposed an endless conveyer, 79, preferably formed with slats 80, carried by sprocket chains 81. These sprocket chains engage forward and rear sprocket wheels 82 and 83, rigidly mounted upon shafts 84 and 85, connected with the frame 71'. The forward sprocket wheels 82 are rigidly connected with gears 86, engaging smaller gears 87, in turn rigidly secured to the axle 15. The upper portion of the conveyer or apron 79 travels rearwardly to conduct the cut stalks, in a more or less vertical position, into engagement with curved or converging feeding or guiding means.

This feeding or guiding means includes curved frame sections 88, which are vertical, and rigidly mounted upon the auxiliary frame 71'. The rear ends of these frame sections are spaced, forming an opening which is normally closed by a gate 89, hinged at its lower end, at 90, to swing in a vertical plane, whereby the gate may assume vertical and horizontal positions. The gate has a pair of pivoted latches 91 secured to its upper end, and these latches are adapted to engage keepers 92, secured to the converging frame sections 88, said latches being drawn downwardly by springs 93.

The numeral 94 designates horizontal bars, preferably carried by the guide beams 52, but arranged above the same, and projecting across the conveyer 79, in spaced relation to the frame sections 88. Spaced fingers 95 are arranged at the entrance to the shock forming frame and are pivoted or rule-jointed upon these bars, to swing rearwardly only, and this rearward movement is opposed by springs 96. The fingers 95 are arranged at the entrance to the shock forming frame and have their outer ends arranged near the frame sections 88 for automatically admitting and retaining the cut stalks in said frame. A curved strip or bar 97 is secured to the bars 94, and constitutes the forward side of the shock forming frame.

The numeral 98 designates a tower or vertical support, which is rigidly mounted upon the platform 77. Pivoted upon the upper end of this tower to turn in a horizontal plane is a bevel gear 99, engaged by a bevel gear 100, turned by a crank 101. A head or casting 102 is formed upon the upper side of bevel gear 99 and carries a horizontally swinging overhanging arm 103. This arm has a pulley or sheave 104 secured to its free end, engaged by a cable 105. This cable has a hoisting frame 106 secured thereto, to which are pivoted hooks 107, to engage with the shock. The cable 105 is secured to a drum 108, to be wound thereon, and this drum is carried by a shaft 109, pivoted within ears 110 formed upon the head 102. The shaft is turned by a crank 111, and the shaft carries a ratchet wheel 112 engaged by a pawl 113.

The operation of the machine is as follows:

The pull is applied to the tongue 22, and the machine drawn down the rows of corn, the stalks in the rows entering the guide passages 53, to be engaged by the fingers 45. These stalks are thereby brought into engagement with the coacting stationary and rotatable cutters, whereby they are cut and transferred to the stationary conveyer plates 71, the stalks being slid rearwardly along these plates in an upright position by engagement with the fingers 45 and guide beams 54. At the rear ends of the plates 71 the stalks are fed to the intake end of the conveyer or apron 79, passing the pivoted fingers 95, which aid in retaining them vertical. The two sets of cut stalks are thus fed upon the apron and carried rearwardly, in slidable contact with the converging frame sections 88, whereby they are crowded and formed into the shock, which is completed when the shock frame is substantially filled, and the diameter of the base of the shock is substantially equal to the width of the gate 89 which may, of course, be varied, if desired.

The machine is now stopped, and the shock tied, in the usual manner. The hoisting frame 106 is lowered and the hooks engaged with the shock, the frame being again suitably elevated. The gate 89 is swung to the open position, and the arm 103 swung rearwardly, thereby carrying the shock to the rear of the machine, whereby it may be deposited upon the ground, in a vertical position, as is customary.

It is to be understood that the form of my invention herewith shown and described is to be taken as a preferred example of the same, and that various changes in the shape, size, and arrangement of parts may be resorted to without departing from the spirit of my invention, or the scope of the subjoined claims.

Having thus described my invention, I claim:

1. In a machine for cutting and shocking corn, a wheeled frame, a pair of longitudinally extending guide devices carried by the frame to receive the stalks of corn therein, stalk engaging means and feeding means operating within the guide devices, cutting means carried by the frame and disposed to engage the stalks within the guide devices, an endless conveyer disposed at the rear end of the guide devices to receive the stalks therefrom, an upstanding shock forming frame supported in fixed relation to said wheeled frame above and near the conveyer, a gate in said shock forming frame, and means for discharging a shock through said gate.

2. In a machine for cutting and shocking corn, a wheeled frame, a longitudinally extending guide device carried by the frame, to receive the stalks of corn, means to feed the stalks through the guide device, means to cut the stalks, a traveling conveyer at the rear end of the guide device, an upstanding shock forming frame supported in fixed relation to said wheeled frame near and above the traveling conveyor a gate in said shock forming frame to be moved to opened and closed positions, and hoisting mechanism carried by the wheeled frame to elevate the shock and pass it through the opening of the gate.

3. In a machine for cutting and shocking corn, a wheeled frame, a conveyer carried thereby, a shock forming frame arranged near and above the conveyer and having an entrance passage over the front end of the conveyer, means for cutting the corn stalks and feeding the cut stalks to said entrance passage, and spring pressed rule-jointed fingers arranged at the entrance to the shock forming frame for the purpose specified.

4. In a machine for cutting and shocking corn, a wheeled frame, a conveyer carried thereby, a shock forming frame comprising an upstanding frame member arranged near and above the conveyer and converging toward its rear end, and a frame member disposed between the front ends of said converging frame member and spaced from the ends thereof for forming inlet openings, means for cutting and feeding the cut stalks to the conveyer through said inlet openings, and spring pressed rule-jointed fingers arranged in said inlet openings to automatically admit and retain the stalks in said shock forming frame.

In testimony whereof I have hereunto affixed my signature this 21st day of June, 1920.

THOMAS F. KUHN.